United States Patent Office

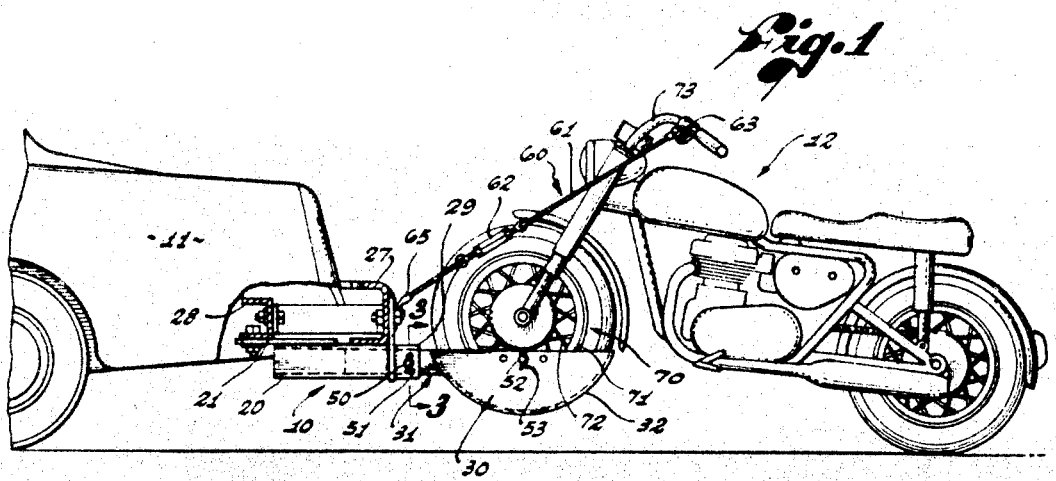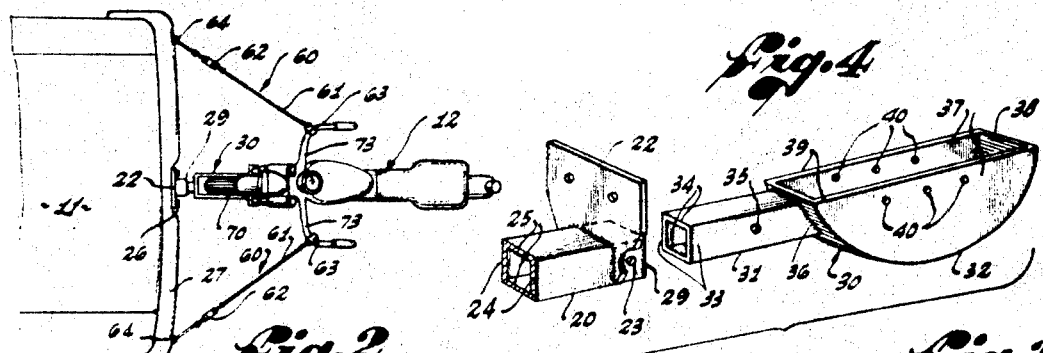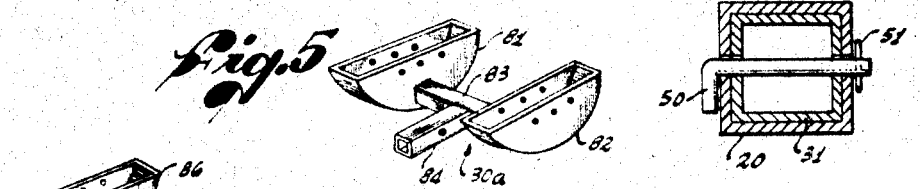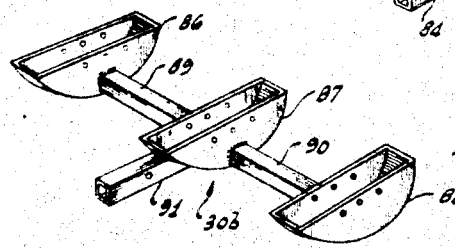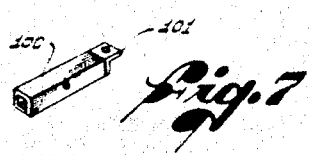
INVENTOR.
FRED N. McCANCE
BY Fulwider, Patton, Rieber, Lee, and Utecht
ATTORNEYS

3,428,332
Patented Feb. 18, 1969

1

3,428,332
TOWING APPARATUS
Fred N. McCance, 68–805 E St.,
Cathedral City, Calif. 92234
Filed Sept. 1, 1966, Ser. No. 576,718
U.S. Cl. 280—292          11 Claims
Int. Cl. B62h *1/00;* B62d *53/04*

ABSTRACT OF THE DISCLOSURE

A towing apparatus for towing a two-wheeled vehicle such as a motorcycle behind another vehicle such as an automobile. The apparatus includes a wheel carrier detachably attached to the rear of the towing vehicle by means of a pair of keyed telescoping sleeves, one of which remains affixed to the towing vehicle. The carrier includes a cradle into which the pivotal steering wheel of the towed vehicle rides. A pair of guys between the towing vehicle and a second portion of the steering assembly such as the handlebars of the towed vehicle maintains the pivotal steering wheel of the towed vehicle in a fixed attitude with respect to the towing vehicle so that the pivoting point of the towing combination is the pivot point of the steering assembly of the towed vehicle. An alternate embodiment is a carrier with a plurality of cradles for towing a plurality of two-wheeled vehicles.

---

The present invention relates generally to apparatus for towing one vehicle behind another vehicle and, more particularly, to apparatus for towing a two-wheeled vehicle such as a motorcycle or bicycle behind another vehicle such as an automobile.

The rise in popularity of motorcycling and motorcycle clubs has resulted in club activities which require the motorcycle owner to transport his motorcycle a considerable distance from his home. For this and other reasons, a need has developed for a satisfactory means of towing a motorcycle behind an automobile or truck over distances which would be impractical for comfortable use of the motorcycle itself.

Typical devices for towing motorcycles normally comprise a frame-work especially designed for the motorcycle to be towed and employ conventional towing hitches and lugs to attach the frame-work and motorcycle to the automobile or truck. When these devices are used, a considerable time is usually required to attach and detach both the towing device and the motorcycle from the automobile or truck. In addition, these devices are usually directly attached to the frame of the motorcycle and may, in some instances, damage the motorcycle itself.

Because the vehicle employed to tow a motorcycle is often an automobile which is not continually used for this purpose, it is desirable that a towing device be quickly and easily attachable to and detachable from the towing vehicle. It is also desirable that the motorcycle be attached to the towing device in a manner which will minimize the possibility of damage to the motorcycle itself. Furthermore, the relative inexperience of new motorcycle owners with towing other vehicles also makes it desirable that the combination of the towing vehicle and the towed motorcycle be easily maneuverable. Also, since motorcycling has become a family sport, it is desirable to be able to tow a plurality of motorcycles behind a single towing vehicle whenever the need arises.

With the foregoing in mind, it is an object of the present invention to provide a new and improved vehicle towing apparatus wherein the towed vehicle can be quickly and easily attached to, or detached from, the towing apparatus.

2

It is also an object to provide a new and improved towing apparatus with a fixed portion which can remain mounted on the towing vehicle and a detachable portion which can be quickly and easily attached to, or detached from, the fixed portion.

Another object is to provide a new and improved towing apparatus wherein a fixed portion of the apparatus which remains mounted on the towing vehicle can be used with alternative detachable portions fitted with conventional towing lugs.

A further object of the invention is to provide a cycle towing apparatus wherein the towing vehicle and towed cycle combination is easily maneuverable.

A still further object of the invention is to provide a cycle towing apparatus which can accommodate one or a plurality of cycles.

The foregoing and additional objects and advantages of the invention will appear from the following description, when considered in conjunction with the accompanying drawings, wherein:

FIGURE 1 is a partial, elevational view of a towing vehicle with a motorcycle in position to be towed, using a presently preferred embodiment of the towing apparatus of the invention, a portion being broken out in section to illustrate the manner in which the apparatus is mounted on the towing vehicle.

FIGURE 2 is a top plan view of the arrangement shown in FIGURE 1.

FIGURE 3 is an enlarged, sectional view, taken along the line 3—3 in FIGURE 1.

FIGURE 4 is an exploded, perspective view of the fixed and detachable portions of the towing apparatus of the invention shown in FIGURES 1 and 2, parts of which are shown in section.

FIGURES 5 and 6 are perspective views of alternative embodiments of detachable portions of the towing apparatus of the invention.

FIGURE 7 is a perspective view of a member fitted with a conventional towing lug and adapted for use with a portion of the towing apparatus of the present invention.

Referring now to the drawings, and particularly to FIGURE 1 thereof, a motorcycle 12 is shown in a position to be towed by an automobile 11, employing a towing apparatus 10 which represents a presently preferred embodiment of the invention. The towing apparatus 10 includes a wheel carrier 30 having an integral mounting sleeve 31 extending therefrom and adapted to be slidably received within a larger fixed sleeve 20 attached to the rear of the automobile 11.

The fixed sleeve 20 is of rigid mechanical construction and has a generally rectangular cross-section. A front mounting plate 21 and a rear mounting plate 22 are attached by any commonly employed means, such as by welding, to the sleeve 20. The mounting plates 21 and 22 are used to secure the fixed sleeve 20 to the rear end of the automobile 11 so that the orientation of the longitudinal axis of the sleeve is substantially horizontal and generally aligned in the direction of the length of the towing vehicle. The shape of the rear mounting plate 22 is adapted to fit the rear bumper 27 of the automobile 11, and the shape of the mounting plate 21 is adapted to fit the rear frame of the automobile. However, the mounting plates 21, 22 may be adapted to fit any portion of the rear of the automobile which is convenient to effect their purpose.

The carrier 30 includes a cradle 32 and an attached mounting sleeve 31. The cradle 32 has a pair of substantially vertical and parallel side plates 37 which have the general geometrical configuration of segments of a circle, the widest chords of which form the edges 39 located at the top of the cradle 32. The side plates 37 are held together in spaced apart, parallel relationship by a cylindrically shaped floor plate 38 attached to each of the side plates along the circular edges of the side plates. The dimensions of the side plates 37 and the associated floor plate 38 are chosen so that the size and shape of the compartment defined within the assembled cradle 32 substantially conforms to the size and shape of the lower portion of a front wheel 70 on the motorcycle 12. A preferably snug fit is thereby afforded between the front wheel 70 and the cradle 32, the floor plate 38 contacting the tread portion of the front wheel 70 and the side plates 37 contacting the sidewalls of the wheel.

As is best observed in FIGURE 4, the cradle 32 is provided with a plurality of holes 40 arranged in pairs, one hole of each pair passing through one of the side plates 37 and the second hole of each pair passing through the opposite side plate of the cradle. The holes 40 of each pair pass through the side plates 37 on a coincident axis normal to the side plates. The holes 40 are positioned so as to pass slightly above the inside edge of a rim 71 of the front wheel 70 placed in the cradle. The holes 40 are spaced so that a keeper pin 52 may be passed through at least one pair of holes 40 without contacting the spokes 72 of the wheel. A cotter pin 53 serves to secure the keeper pin 52 in position.

The mounting sleeve 31 is preferably of rigid construction and of a rectangular cross-section adapted to mate with the fixed sleeve 20 in telescoping engagement. The rectangular cross-section of the fixed sleeve 20 and of the mounting sleeve 31 serves to key the mounting sleeve against rotation within sleeve 20. The mounting sleeve 31 has an end 36 which conforms to the curvature of the floor plate 38 and is attached thereto by any commonly employed means, such as by welding, so that the open end of the compartment defined within the cradle 32 is directed upwardly.

As shown in FIGURE 4, the edges 39 of the cradle 32 are substantially parallel to the common axis of the mounting sleeve 31 and the fixed sleeve 20 when the sleeves are in telescoping engagement. It will be appreciated, however, that the orientation of the mounting sleeve 31 relative to the edges 39 can be varied over a wide range so long as the lower portion of the wheel 70 will remain in engagement with the cradle 32 when the wheel is placed within the cradle compartment.

As is best observed in FIGURE 4, holes 23 pass through both the vertical sidewalls 24 on a common axis normal to both sidewalls 24. The common axis of the holes 23 is vertically located approximately midway between the planes of the upper and lower horizontal walls 25 of the sleeve 20. Holes 35 are also provided which also pass through both vertical sidewalls 33 of the mounting sleeve 31 on a common axis normal to both sidewalls 33. The holes 23 and the holes 35 are vertically located so that they can be brought into registry when the mounting sleeve 31 is in telescoping engagement with the fixed sleeve 20. The holes 35 are horizontally located at a point along the length of the mounting sleeve 31 so that, when holes 23 and 35 are in registry, the overlapping portions of the sleeves 20, 31 in telescoping engagement are of sufficient length to provide sufficient strength and rigidity transverse to the longitudinal axes of the sleeves to support the weight of the front wheel 70.

While the aligned holes 23 and 35 are shown in FIGURES 1 and 4 as passing through a portion 29 of the fixed sleeve 20 which projects a short distance beyond the rear mounting plate 22, it will be appreciated that the holes may be horizontally located at any point along the length of the telescoping sleeve assembly which permits the holes to be brought into registry. It will also be appreciated that the reason for providing the projecting portion 29 of the sleeve 20 is to afford convenient access to the aligned holes 23 and 35 for insertion and removal of the pin 50 and that the projecting portion is not essential to proper operation of the towing apparatus 10.

Further cooperating with the fixed sleeve 20 and the carrier 30 are two guys 60, each of which consists of a suitable length of cable 61, preferably interrupted by a suitable length adjusting means such as a turnbuckle 62. One end of each guy 60 is attached to a handlebar 73 of the motorcycle 12 by a suitable clamping means 63, and the opposite end of each guy is attached, by any suitable means such as an eye bolt 65, to a mounting point 64 on the rear bumper 27 of the automobile 11. The locations of the mounting points 64 are selected to provide an angle of sufficient magnitude between the guys 60 and the longitudinal axis of the towing apparatus 10 so that the guys extend substantially outwardly from the plane of the front wheel 70 in the cradle 32 and toward the rear bumper 27. In these positions, the guys 60 tend to substantially arrest deviations of the front wheel 70 from a vertical plane. It will be appreciated that the attachment of the ends of the guys 60 to the handlebars 73 of the motorcycle 12 is only representative of a preferred attachment configuration and that the ends of the guys can be attached to any portion of the steering assembly of the motorcycle which remains fixed with respect to the plane of the front wheel 70.

In operation, the fixed sleeve 20 is mounted on the automobile 11 in a rearwardly extending horizontal attitude, as shown in FIGURES 1 and 2. The mounting sleeve 31 of the carrier 30 is telescoped into the fixed sleeve 20 until the holes 23 and 35 are in registry. The keeper pin 50 (FIGURE 3) is inserted through the holes 23 and 35 and secured in position by means of a cotter pin 51. The front wheel 70 of the motorcycle 12 is then placed in the cradle 32 and a keeper pin 52 is inserted through one of the pairs of aligned holes 40 in cradle 32, the pin passing over the rim 71 of front wheel 70 and between the spokes 72. The keeper pin 52 is secured in place by a cotter pin 53.

The aforedescribed operational procedure positions the front wheel 70 above the ground with the plane of the wheel maintained substantially vertical by the side plates 37 of the cradle 32. To aid in maintaining the plane of the front wheel 70 in a substantially vertical attitude, the guys 60 are attached to the automobile 11 and to the handlebars 73 of the motorcycle 12. The lengths of the guys 60 are then shortened, if necessary, by means of the turnbuckles 62, so that sufficient tension is generated in the guys to substantially arrest any deviations from a vertical plane of the front wheel assembly of the motorcycle 12.

It will be appreciated that, with the front wheel 70 of the motorcycle 12 thus positioned, the front wheel is held relatively stationary with respect to the automobile 11 and, further, that there are no pivotal joints on the towing apparatus 10 itself. The only pivotal joint which is operative between the automobile 11 and the motorcycle 12 is the pivotal joint incorporated in the steering mechanism of the motorcycle itself. This elimination of pivotal joints in the towing apparatus 10 greatly simplifies the construction of the towing apparatus.

The use of the pivotal joint of the steering mechanism of the motorcycle 12 locates the pivotal steering axis of the towing system a sufficient distance from the rear of the automobile 11 to allow the towed vehicle, here the motorcycle 12, to swing through a greater angle than would otherwise be possible with conventional towing devices which have pivotal joints located closer to the rear of the automobile 11. This greater angle of permissible swing for the rear portions of the motorcycle 12 results in much greater maneuverability of the towing combination.

FIGURES 5 and 6 show alternate constructions of the carrier 30, generally designated as a double carrier 30a and a triple carrier 30b, for towing two and three motorcycles, respectively.

FIGURE 5 shows the double carrier 30a, which comprises a mounting sleeve 84 attached by any commonly employed means, such as by welding, to a cross sleeve 83 at a central point on the cross sleeve. Cradles 81 and 82 are attached to opposite ends of the cross sleeve 83 and are oriented with respect to the longitudinal axis of the mounting sleeve 84 in the same manner as the cradle 32 is oriented relative to the mounting sleeve 31.

The triple carrier 30b in FIGURE 6 has a mounting sleeve 91 and a central cradle 87 attached thereto in the same manner as the single carrier 32 is attached to the mounting sleeve 31 in FIGURE 4. Side sleeves 89 and 90 couple additional side cradles 86 and 88 to the central cradle 87 in such a manner that all three cradles are oriented with respect to the mounting sleeve 91 as the single cradle 32 is oriented with respect to the axis of the mounting sleeve 31.

In operation, the double and triple carriers 30a and 30b, respectively, engage the fixed sleeve 20 in the same manner as does the previously described single carrier 30. Two or three motorcycles are then positioned in the cradles of the double or triple carriers, 30a or 30b, respectively. Guy means (not shown), similar to guys 60 in FIGURES 1 and 2, are then attached to the handlebars of the motorcycles and to points on the automobile 11 to substantially prevent lateral movement of the front wheels of the motorcycles.

FIGURE 7 shows a sleeve 100 which is similar to the mounting sleeve 31 but which has, in place of the cradle 32, a conventional trailer hitch towing lug 101. When the towing apparatus 10 is not being used to tow a motorcycle 12, the mounting sleeve 100 and associated lug 101 may be substituted for the carrier 30. The sleeve 100 is inserted within the fixed sleeve 20 and secured in place by the keeper pin 50 and cooperating cotter pin 51. The exposed lug 101 is then properly positioned for use with conventional trailer hitches.

While a preferred embodiment and various alternatives of the invention have been described in detail, it will be understood that modifications in design and construction can be made without departing from the spirit and scope of the invention. Hence, the invention is not to be limited except as defined in the appended claims.

I claim:

1. An apparatus for use with a towing vehicle to tow a vehicle having two wheels, one of said wheels being a pivotal wheel which is incorporated in a steering assembly, said apparatus comprising:
    first means for attaching and supporting said pivotal wheel with respect to said towing vehicle; and
    second means for coupling a portion of said steering assembly to said towing vehicle to maintain said pivotal wheel in a substantially vertical plane, said plane being substantially fixed in a rearwardly extending attitude with respect to said towing vehicle.

2. A towing apparatus as defined in claim 1, wherein said first means comprises:
    a first sleeve adapted to be affixed to said towing vehicle; and
    a carrier adapted to engage said pivotal wheel, said carrier having a second sleeve adapted to slidably and detachably engage said first sleeve to maintain said carrier in a substantially fixed rearwardly extending attitude with respect to said towing vehicle.

3. A towing apparatus as defined in claim 1, wherein said first means comprises:
    a substantially rectangular first sleeve adapted to be affixed to said towing vehicle and extend rearwardly with respect to said towing vehicle; and
    a carrier adapted to engage said pivotal wheel, said carrier having a substantially rectangular second sleeve adapted to slidably and detachably engage said first sleeve to maintain said carrier in a substantially fixed rearwardly extending attitude with respect to said towing vehicle.

4. An apparatus for use with a towing vehicle to tow a vehicle having two wheels, one of said wheels being a pivotal wheel which is incorporated in a steering assembly, said apparatus comprising:
    means for attaching said pivotal wheel to said towing vehicle, said means including a non-round first sleeve adapted to be affixed to said towing vehicle and extend rearwardly with respect to said towing vehicle,
    said means further including a carrier having a cradle for engaging said pivotal wheel, said carrier also having a non-round second sleeve adapted to slidably and detachably engage said first sleeve to maintain said cradle in a substantially fixed rearwardly extending attitude with respect to said towing vehicle;
    means for locking said first and said second sleeves together when said sleeves are in engagement; and
    guy means for coupling spaced points on said steering assembly to spaced points on said towing vehicle in a manner to maintain said pivotal wheel in a substantially fixed vertical and rearwardly extending attitude with respect to said towing vehicle.

5. A towing apparatus as defined in claim 4, wherein:
    said first sleeve has a first hole therethrough;
    said second sleeve has a second hole therethrough so located as to register with said first hole when said first and said second sleeves are in engagement; and
    said locking means is a keeper pin passing through said first and said second holes.

6. A towing apparatus as defined in claim 4, wherein said cradle includes a pair of side plates in substantially the shape of segments of circles, said side plates being spaced apart by a cylindrical floor plate attached to both of said side plates along their curved edges.

7. An apparatus for use with a towing vehicle to tow a vehicle having two wheels, one of said wheels being a pivotal wheel with associated handlebars, said apparatus comprising:
    attaching means on said towing vehicle for receiving and supporting said pivotal wheel, said attaching means being substantially fixed in a rearwardly extending vertical attitude with respect to said towing vehicle; and
    means for coupling said handlebars at spaced points thereon to spaced points on said towing vehicle to substantially fix said pivotal wheel in a rearwardly extending vertical plane with respect to said towing vehicle.

8. An apparatus for use with a towing vehicle to tow a vehicle having two wheels, one of said wheels being a pivotal wheel with associated handlebars, said apparatus comprising:
    means for attachment to said towing vehicle, said means including a first sleeve adapted to be affixed to said towing vehicle and extend rearwardly with respect to said towing vehicle;
    a carrier having a cradle for receiving and supporting said pivotal wheel, said carrier also having a second sleeve adapted to non-rotatably and detachably engage said first sleeve to maintain said cradle in a substantially fixed rearwardly extending attitude with respect to said towing vehicle;
    means for locking said first and said second sleeves together when said sleeves are in engagement; and
    guy means for coupling spaced portions of said handlebars to said spaced portions of said towing vehicle in a manner to fix said pivotal wheel in a rearwardly extending substantially vertical plane with respect to said towing vehicle.

9. A towing apparatus as defined in claim 8, wherein:
    said first sleeve is substantially rectangular and has a first hole therethrough;
    said second sleeve is substantially rectangular and has a second hole therethrough so located as to register with said first hole when said first and said second sleeves are in engagement; and
    said locking means includes a keeper pin passing through said first and said second holes.

10. A towing apparatus as defined in claim 8, wherein said cradle includes a pair of side plates in substantially the shape of segments of circles, said side plates being spaced apart by a cylindrical floor plate attached to said side plates along their curved edges, and means operatively associated with said cradle for locking said wheel therein.

11. A towing apparatus for use with a towing vehicle to tow a plurality of two-wheeled vehicles, one wheel of each of said two-wheeled vehicles being a pivotal wheel which is incorporated in a steering assembly, said apparatus comprising:

means for attaching each of said pivotal wheels to said towing vehicle, said means including a substantially rectangular first sleeve adapted to be affixed to said towing vehicle and extend rearwardly with respect to said towing vehicle, said attaching means further including a carrier having a cradle for engaging each of said pivotal wheels, said carrier also having a substantially rectangular second sleeve adapted to slidably and detachably engage said first sleeve to maintain said cradle in a substantially fixed rearwardly extending attitude with respect to said towing vehicle; and means for coupling each of said steering assemblies to said towing vehicle to substantially maintain said pivotal wheels in a fixed rearwardly extending vertical attitude with respect to said towing vehicle.

References Cited

UNITED STATES PATENTS

| 1,887,202 | 11/1932 | Hess | 280—292 |
| 1,954,361 | 4/1934 | Lewter | 280—292 |
| 2,280,734 | 11/1939 | Tyler | 280—292 |
| 2,635,891 | 4/1953 | Cook | 280—495 |
| 2,789,832 | 4/1957 | Zumwalt | 280—292 |

FOREIGN PATENTS 904,744   1/1954   Germany

BENJAMIN HERSH, *Primary Examiner.*

JOEL E. SIEGEL, *Assistant Examiner.*

U.S. Cl. X.R.

280—402